United States Patent [19]
Hurst

[11] 3,792,438
[45] Feb. 12, 1974

[54] PERIPHERAL ACCESS CONTROL

[75] Inventor: Derek Hurst, Hitchin, England

[73] Assignee: International Computers Limited, London, England

[22] Filed: Apr. 28, 1972

[21] Appl. No.: 248,567

[30] Foreign Application Priority Data

Apr. 30, 1971 Great Britain .................. 12,310/71

[52] U.S. Cl. .................................... 340/172.5
[51] Int. Cl. .................................... G06f 3/00
[58] Field of Search .......................... 340/172.5

[56] References Cited

UNITED STATES PATENTS

| | | | |
|---|---|---|---|
| 3,559,187 | 1/1971 | Figueroa et al. | 340/172.5 |
| 3,526,878 | 9/1970 | Bennett et al. | 340/172.5 |
| 3,573,741 | 4/1971 | Gavril | 340/172.5 |
| 3,587,044 | 6/1971 | Jenkins | 340/172.5 |
| 3,573,740 | 4/1971 | Berger et al. | 340/172.5 |

*Primary Examiner*—Gareth D. Shaw

[57] ABSTRACT

Access is frequently required between a central processing arrangement and a plurality of peripheral equipments each associated with buffer storage. Control of such access is provided using a local store which has, for each peripheral, two storage locations, one for the control word appropriate to the peripheral and the other as an additional data word buffer. In this way setting up an access is speeded as also is the freeing of common data highways.

4 Claims, 2 Drawing Figures

PERIPHERAL ACCESS CONTROL

BACKGROUND TO THE INVENTION

The invention relates to controlling access between a central processing arrangement and a plurality of stations.

The efficiency of a computer installation depends on many factors including the time taken to establish access between a peripheral facility, such as a printer, bulk store or input terminal, and the central processing arrangement. Each peripheral facility may be connected to a different standard interface constituting a station. It is well known to provide each such station with a buffer capable of storing a predetermined number of data words. However, it is normally necessary, in order to transfer from the buffer, to have available a control word associated with the peripheral served by the corresponding station. Fetching this control word takes up machine time.

SUMMARY OF THE INVENTION

According to the invention, there is provided apparatus for controlling access between a plurality of stations and a central processing arrangement, comprising information storage means having distinct pairs of word locations assigned to different ones of the stations, respectively, with for each pair, one location serving for storing a control word associated with the corresponding station and the other location serving for receiving a data work from and/or for that corresponding station, and means for selecting anyone of said location pairs when access is given to the corresponding station.

Embodiments of the invention ensure that the relevant control word is immediately available, i.e. without requiring machine time for fetching it from the central processing arrangement.

One such embodiment may comprise a data highway common to all of the stations and having selective connection therewith and with either the input or output of the storage means via gated signal paths. Preferably, the gated signal path from the highway to the storage means input is both OR-ed with a gated output for data or control words from the central processing arrangement and selectively and alternatively gated onto an input path to the central processing unit.

INTRODUCTION TO THE DRAWINGS

One embodiment of the invention will now be particularly described, by way of example, with reference to the drawings, in which:

FIG. 1 shows information flow patterns during input and output between a peripheral station and a central computing arrangement, and FIG. 2 shows one arrangement of gated communication paths affording the flow patterns of FIG. 1.

DESCRIPTION OF PREFERRED EMBODIMENTS

Figure 1:
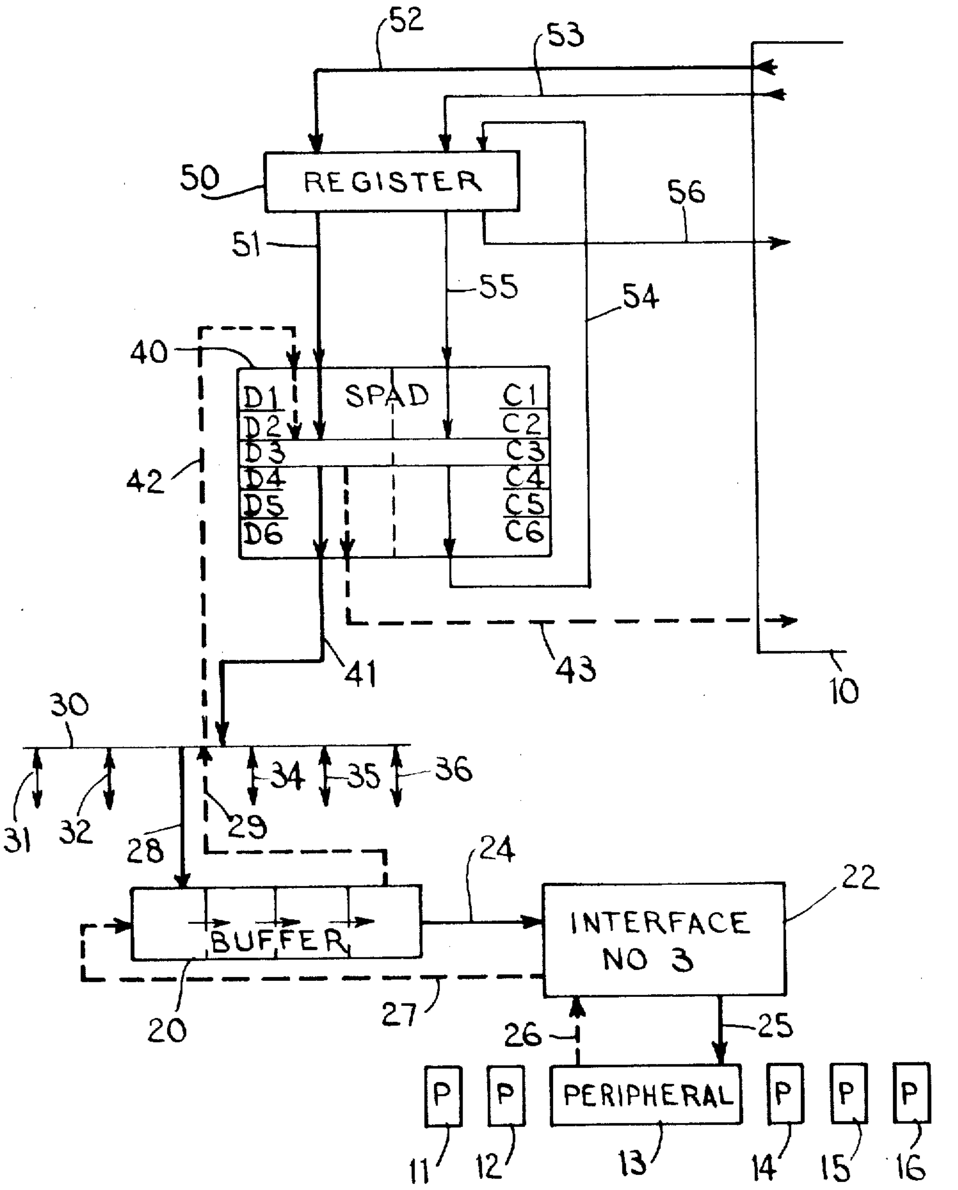

For illustrative purposes, access will be considered for a system having one central processing unit (CPU) 10 and up to six peripheral machines 11 to 16. Different numbers of peripherals and/or further central processor units can be used with suitable modifications.

For one peripheral, 13, an input/output buffer 20 is shown having a capacity of four words of information. Each of the peripherals 11 to 16 is associated with a distinct buffer similar to that referenced 20. Communication between a peripheral and the corresponding buffer is shown to be via a standard interface, shown at 22 for the peripheral 13, Throughout FIG. 1, the convention is adopted that output data flow to the peripheral 13 is shown by full thick lines, input data flow from the peripheral 13 by dashed thick lines, and control information flow by full, relatively thin lines.

The arrowed lines 24 and 25 thus represent data word flow from the buffer 20 to the peripheral 13, and the arrowed dashed lines 26 and 27 represent the opposite direction of data flow. The arrowed lines 28 and 29 shown both directions of data flow between the buffer 20 and a data highway 30 which is also common to information flow relative to each of the other peripherals 11, 12, 14, 15 and 16 indicated by the lines 31, 32, 34, 35 and 36, respectively.

Access between any one of the peripherals 11 to 16 and the central processor unit 10 via the highway 30 will be possible only at specified times. Each time, a particular control word for the peripheral concerned will be required. In embodiments of the invention, this is immediately available in storage means shown as a scratch pad store (SPAD) 40, which has a pair of word locations for assignment to each peripheral.

One word location, C1 to C6, of each pair is intended for storing the respective control word, while the other location, D1 to D6, is available for storing a data word from the buffer of the associated peripheral. For convenience in representing information flow patterns, the C and D locations are indicated in different halves of the block 40 representing the scratch pad store with separate input and output indications to those halves.

The word location pairs C1–D1 to C6–D6 are assumed to be assigned to the interfaces or stations associated with the peripherals 11 to 16, respectively. So, within the block 40, data and control word input and output arrows are shown extending to and from the word locations D3 and C3 to correspond with interface 22 and peripheral 13. The required connections within the scratch pad store 40 will be made selectively in accordance with which peripheral has access.

Both directions of data flow between the highway 30 and the scratch pad store 40 are shown by the arrowed lines 41 and 42. Provision is, of course, also made for input data from the peripheral to flow from the scratch pad store 40 to the central processor unit 10 as indicated at 43. Also, as indicated at 41, output data for the peripheral is available from the central processor unit 10 through a register 50, as shown at 51, and the store 40. The register 50 can receive data, or an updated control word, from the central processor unit 10 as shown at 52 and 53, respectively, The register 50 can also receive a control word directly from the scratch pad 40 as shown at 54, and supply a control word to the scratch pad store 40 and the central processor unit 10 as shown at 55 and 56, respectively. Thus, for example, a control word from the store 40 may be transferred through the register 50 to the central processing unit 10. Provision may also be made to transfer a control word directly from the scratch pad store 40 to the central processing unit 10.

So, when a peripheral is given access, the relevant control word is immediately available to the processor 10 from the scratch pad store 40, in order to allow immediate data word storage, say, in the main processor memory, for example. At least the time required to fetch the control word from the central processing unit is thus saved. Also, the availability of the control word for updating or replacement if the program changes or the peripheral is substituted or omitted is not materially affected. Such an updated or replacement control word would be supplied from the central processing unit 10 over path 53 to the register 50 and thence to the store 40.

Figure 2:
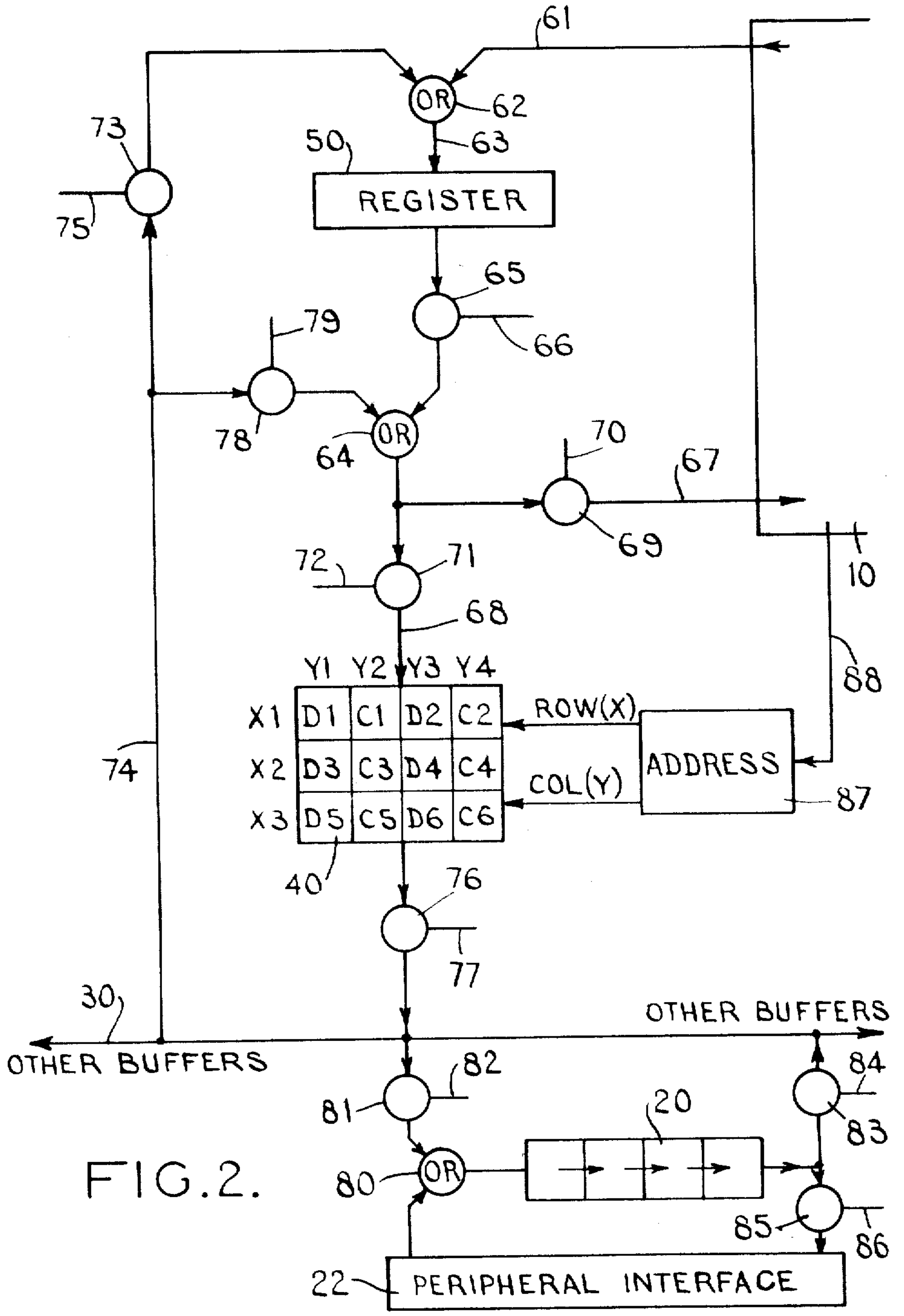

The arrowed lines of FIG. 1 are not intended to indicate necessarily separate communication paths. In practice, some will be combined in whole or part and controlled by suitable gating arrangements. One example of interconnections between a typical interface 22, a typical buffer 20, the highway 30, the scratch pad store 40, the register 50 and the central processor unit 10 is shown in FIG. 2.

The data and control word flow from the central processor unit 10 to the register 50 is over a path 61, through an OR gate 62 and over the OR gate output 63. The output of the register 50 is available via another OR gate 64 only when a gate 65 is enabled on line 66. Whether the output of the latter OR gate 64 is made available to the central processor unit 10 on path 67, or to the scratch pad store input on path 68, depends on whether gate 69 is enabled on line 70 or gate 71 is enabled on line 72, respectively.

Control word flow directly from the scratch pad 40 to the register 50 is via another input of the OR gate 62 when a gate 73 in a path 74 from the highway 50 is enabled over line 75. The output of the scratch pad 40 is available on the highway 30 when a gate 76 is enabled over line 77.

The connections and gates so far described can achieve the information flow of arrowed lines 51 to 56 of FIG. 1. Because control words and data words both flow through gate 62 it will be realised that data and control words are preferably treated in separate phases.

Input of data words from the highway 30 to the scratch pad store 40, or output of data words from the scratch pad 40 to the central processor 10, is provided by a tapping from the path 74 via another input of the OR gate 64 when a gate 78 is enabled over line 79. Thus, input data from the highway 30 passes, for example, through gates 78, 64 and 71 into the scratch pad store 40, this path resembling that of arrowed line 42 of FIG. 1. The same data can now pass out of the scratch pad store 40 to the central processor 10 through gate 76 to the highway and then through gates 78, 64 and 69, this path resembling that of arrowed line 43 of FIG. 1.

Transfer of data from the highway 30 to the buffer 20 is via an OR gate 80 when a gate 81 is enabled on line 82. Another input to the OR gate 80 serves for passing data from the interface 22 to the buffer 20. Information flow from the buffer 20 to the highway 30 as indicated by path 29 of FIG. 1 is shown in FIG. 2. as being provided by enabling gate 83 over line 84. The function of the path 24 of FIG. 1 is fulfilled in the FIG. 2 arrangement by connecting the output of the buffer to a gate 85 which passes data to the interface 22 when enabled over line 86.

It will be appreciated that all the connections shown below the highway 30 are repeated for each interface, whilst those above the highway 30 are common. Other gates, for example in the path between the interface 22 and the OR gate 80, will be provided if further control functions are required. Conceivably, on output from the central processing unit 10, more than one set of paths from the highway 30 to an interface may be enabled.

A matrix type organisation of the word locations of the scratch pad store 40 is indicated in FIG. 2. This is a conventional expedient and selection thereof is conveniently by row and column selection signals identifiying the particular row, X1-X3, and column, V1-V4, concerned at any time. These signals are provided by an address signal unit 87 according to decoded command and/or predetermined timing signals from the central processing unit over path 88.

The outputs of the addressing unit 87 and other timing and command signals will be used in a gating control arrangement for energising the gate enabling lines 66,70,72, 75,77,79,82,84 and 86 in an appropriate manner for the information flow operations concerned.

Such gating control arrangement must provide at least the following sequences of gate enabling line energisations from which it will be seen that data word transfers take place in two phases, the first being to transfer the data word into the SPAD 40. In the case of the output data transfer it will be realised that the data word is loaded in the first place in the register 50 from the CPU, through gate 62, without the need to energise the enabling lines.

Thus, for data flow to the peripheral (an output transfer):

Register 50 to SPAD 40 — energise 66 and 72

SPAD 40 to Buffer 20, then to interface 22 — energise 77, 82 and 86

For data flow from the peripheral (an input transfer):

Buffer 20 to SPAD 40 — energise 84,79 and 72

SPAD 40 to CPU 10 — energise 77,79 and 70.

It is to be noted that the CPU requires the information from the control word in the first phase for an output transfer and in the second phase for an input transfer. The control words are transfered into the CPU and are then returned to the SPAD 40 as follows:

For control word flow:

First, from SPAD 740 to Register 50 — energise 77 and 75

Register 50 to CPU 10 — energise 66 and 70

In order to be returned to the SPAD 40, the control word from the CPU passes over path 61 through gate 62 into Register 50. Then:

From Register 50 to SPAD 40 — energise 66 and 72

Designing a gating arrangement responsive to available timing and command signals from the CPU and the address signals from the unit 87 to perform the above transfers should not present problems. So, in view of the dependence on the particular timing and command signals, details are omitted here.

A considerable degree of autonomy is possible by arranging that the address unit automatically cycles through the location pairs in concert with the gating control arrangement giving access to the peripherals. Provision will be necessary for overriding control of sequencing from the central processor unit. Additional advantage will be gained from providing for the gating control and addressing to be responsive to demands from the peripherals. These facilities are greatly enhanced by the immediate availability both of peripheral control words and storage for data words.

I claim:

1. Apparatus for controlling transfers of data between a plurality of stations and a central processing arrangement including an information storage device having a common input, a common output and a separate pair of corresponding word storage locations, the separate pairs being associated respectively with the different ones of the stations, one location of each pair being arranged to receive a data word in transit between the central arrangement and the associated station, and the other location of the pair storing a control word relating to the associated station; a data buffer for each station; an input register for the storage device; a common transfer highway; selectively operable gating means linking the highway with the station buffers, the storage device input register, the common input and output of the storage device and the central processing arrangement; and means for operating the gating means to control a data word transfer from a source to a selected data word location in a first phase and from the data word location to a destination in a second phase of the transfer, the operating means being effective to transfer the stored control word from that control word location corresponding to the selected data word location to the central processing arrangement during a selected one of said phases in dependence upon the direction of data transfer, and to transfer a control word from the central processing arrangement into the control word location after the selected phase has ended.

2. Apparatus as claimed in claim 1 in which said gating means includes an OR gate connected to provide alternative paths for entry of words to the common input of the storage device from the highway and the input register respectively, said alternative paths each including separate selectively controllable gates.

3. Apparatus as claimed in claim 2 in which said gating menas includes a further separately controllable gate connected to said OR gate to provide a further alternative path to permit a word from the OR gate to be transferred to the central processing arrangement.

4. Apparatus as claimed in claim 3 in which said gating means includes a further separately controllable gate to provide a recirculating path from the highway to allow entry of a word from the highway into the input register and a further OR gate in the recirculating path to provide an alternative entry path into the input register for a word from the central processing arrangement.

* * * * *